United States Patent
Cartmell et al.

(10) Patent No.: US 12,045,184 B2
(45) Date of Patent: Jul. 23, 2024

(54) SYSTEM FOR MONITORING AND CONTROLLING HOST SELECTION FOR A MULTI-HOST CAPABLE PCI-E DEVICE

(71) Applicant: Dell Products L.P., Hopkinton, MA (US)

(72) Inventors: Jerome J Cartmell, Millis, MA (US); Qin Wang, Northborough, MA (US)

(73) Assignee: Dell Products L.P., Hopkinton, MA (US)

( * ) Notice: Subject to any disclaimer, the term of this patent is extended or adjusted under 35 U.S.C. 154(b) by 35 days.

(21) Appl. No.: 18/075,475

(22) Filed: Dec. 6, 2022

(65) Prior Publication Data

US 2024/0184726 A1   Jun. 6, 2024

(51) Int. Cl.
| | | |
|---|---|---|
| *G06F 11/07* | (2006.01) | |
| *G06F 13/28* | (2006.01) | |
| *G06F 13/42* | (2006.01) | |

(52) U.S. Cl.
CPC .......... *G06F 13/28* (2013.01); *G06F 11/0745* (2013.01); *G06F 11/079* (2013.01); *G06F 13/4221* (2013.01); *G06F 2213/0026* (2013.01)

(58) Field of Classification Search
CPC .... G06F 11/0745; G06F 11/079; G06F 13/28; G06F 13/4221
See application file for complete search history.

(56) References Cited

U.S. PATENT DOCUMENTS

| | | | |
|---|---|---|---|
| 9,785,597 B2 * | 10/2017 | Bayer | G06F 13/4072 |
| 10,466,935 B2 * | 11/2019 | Totolos | G06F 3/0631 |
| 2003/0093604 A1 * | 5/2003 | Lee | G06F 13/423 |
| | | | 710/302 |

* cited by examiner

*Primary Examiner* — Nadeem Iqbal
(74) *Attorney, Agent, or Firm* — Anderson Gorecki LLP

(57) ABSTRACT

A storage system that includes multiple CPU hosts and PCI-E multi-host capable devices uses link selection controllers to map shared memory addresses to individual PCI-E links such that each address is accessed via only one of a plurality of PCI-E links. The addresses may be grouped into same-size segments, each of which contains only addresses mapped to the same PCI-E link. The link selection controllers monitor for state changes that affect PCI-E link availability and, in response to detection of a failure, coordinate a response that includes re-mapping the affected addresses.

20 Claims, 5 Drawing Sheets

SYSTEM FOR MONITORING AND CONTROLLING HOST SELECTION FOR A MULTI-HOST CAPABLE PCI-E DEVICE

TECHNICAL FIELD

The subject matter of this disclosure is generally related to data storage systems that utilize multi-host Peripheral Component Interconnect Express (PCI-E) devices.

BACKGROUND

Network-attached storage (NAS), Storage Area Networks (SANs), and other types of organizational storage systems can be configured to maintain logical storage objects containing data used by instances of host applications running on host servers. Examples of host applications may include, but are not limited to, multi-user software for email, accounting, inventory control, manufacturing, engineering, and a wide variety of other organizational functions. The storage objects are abstractions of space on physical storage drives. Each storage object includes a contiguous range of logical block addresses (LBAs) at which blocks of host application data can be stored and accessed using input-output commands (IOs). A single storage array can simultaneously support IOs to storage objects from multiple instances of multiple host applications. PCI-E is an interface standard for connecting high-speed components such as redundant array of independent drives (RAID) cards and solid-state drives (SSDs) with central processing units (CPUs), which are referred to as "hosts" in the PCI-E standard. Multi-host PCI-E devices communicate with multiple hosts using multiple PCI-E links.

SUMMARY

The presently disclosed concepts are predicated in part on recognition that multi-host support can create potential data consistency problems in a storage system because shared memory addresses can be accessed via different PCI-E links.

A method in accordance with some implementations comprises: mapping individual addresses of a shared memory that is accessible by one or more central processing unit (CPU) hosts to one of a plurality of Peripheral Component Interconnect Express (PCI-E) links via which the shared memory is accessible; and responding to a process call by identifying the PCI-E link to which a specified address in the shared memory is mapped.

An apparatus in accordance with some implementations comprises: a plurality of non-volatile drives; and a plurality of compute nodes configured to manage access to the drives, each of the compute nodes comprising local memory that is shared with other ones of the compute nodes and a link selection controller configured to map individual addresses of the shared memory to one of a plurality of Peripheral Component Interconnect Express (PCI-E) links via which the shared memory is accessible and identify the PCI-E link to which a specified address in the shared memory is mapped in response to a process call.

A non-transitory computer-readable storage medium in accordance with some implementations stores instructions that are executed by a storage system to perform a method comprising: mapping individual addresses of a shared memory that is accessible by multiple central processing unit (CPU) hosts to one of a plurality of Peripheral Component Interconnect Express (PCI-E) links via which the shared memory is accessible; and responding to a process call by identifying the PCI-E link to which a specified address in the shared memory is mapped.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
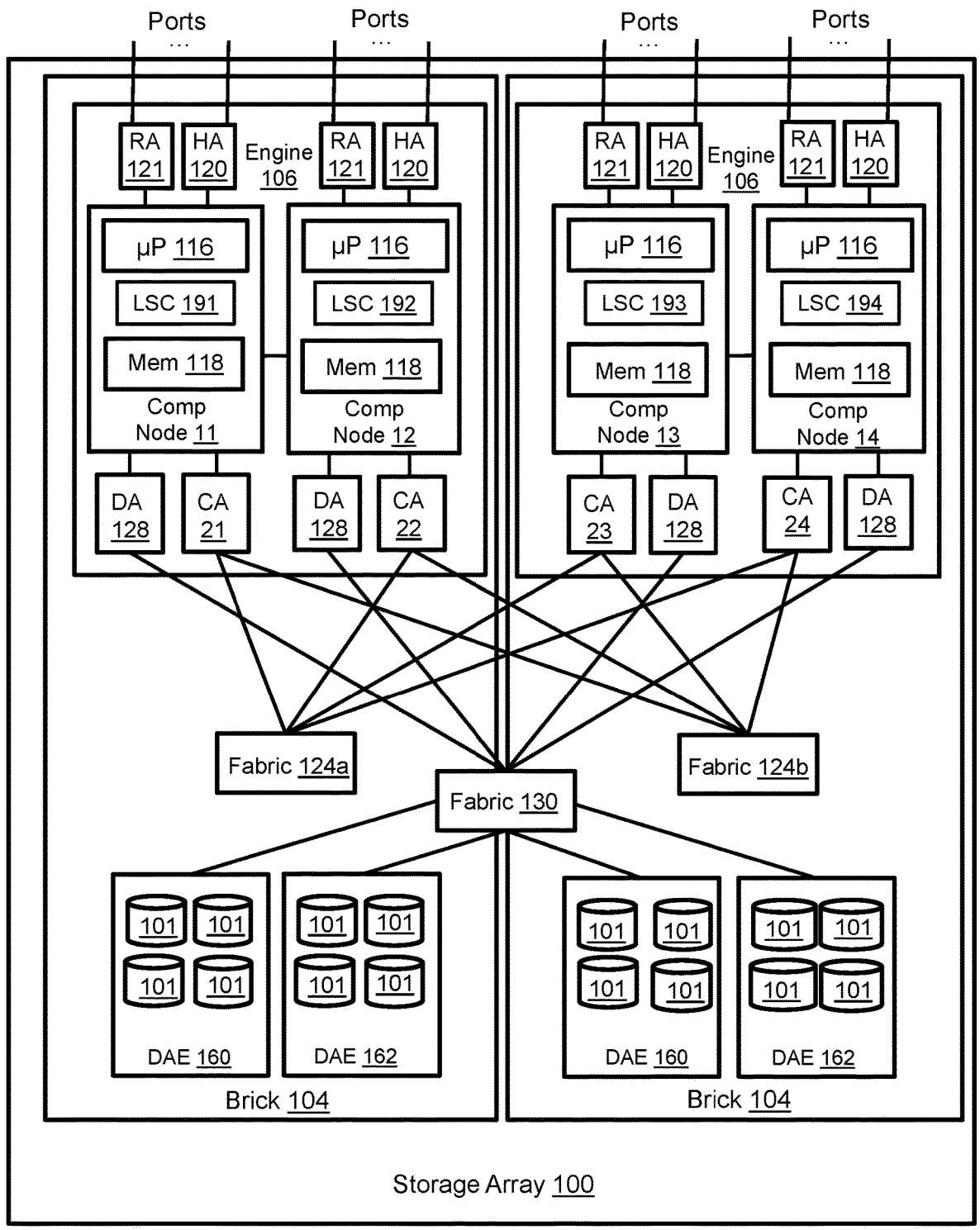
FIG. 1 illustrates a storage system with PCI-E link selection controllers.

FIG. 1 illustrates a storage array 100 with PCI-E link selection controllers 191, 192, 193, 194 for each compute node. As will be explained below, one of the functions performed by the link controllers is to map shared memory addresses to PCI-E links such that each shared memory address is only accessed via one PCI-E link. The storage array 100 includes one or more bricks 104. Each brick 104 includes an engine 106 and one or more disk array enclosures (DAEs) 160, 162. In the illustrated example there are only two engines, but the storage array could include a greater number of engines or a single engine. Each engine 106 includes two PCI-E interconnected compute nodes that are arranged as a memory-mirrored pair for failover and may be referred to as "storage directors." Each compute node may be implemented on a separate printed circuit board or blade and includes resources such as at least one multi-core processor 116 and local memory 118. The processor may include multiple sockets with central processing units (CPUs), graphics processing units (GPUs), or both. The local memory 118, which is not on-board cache, may include volatile media such as dynamic random-access memory (DRAM), non-volatile memory (NVM) such as storage class memory (SCM), or both. Each compute node allocates a portion of its local memory 116 to a shared memory that can be accessed by all compute nodes of the storage array using direct memory access (DMA). Each compute node includes one or more host adapters (HAs) 120 for communicating with external host servers. Each host adapter has multiple ports for communicating with the host servers, which may be referred to as "initiators" that send IO commands to the storage array as a "target." Each initiator-target port pair defines a path. Each host server may be connected to the storage array via multiple ports corresponding to multiple paths that enable load balancing and failover. The host adapter resources include processors, volatile memory, and components such as IO chips that monitor link errors and IO failures such as missing frames, timeouts, and received aborts. Each compute node also includes a remote adapter (RA) 121 with ports for communicating with other storage systems, e.g., the other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node also includes one or more multi-host capable channel adapters (CAs) 21, 22, 23, 24 for communicating with other compute nodes via redundant interconnecting InfiniBand fabrics 124a, 124b. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Figure 2:
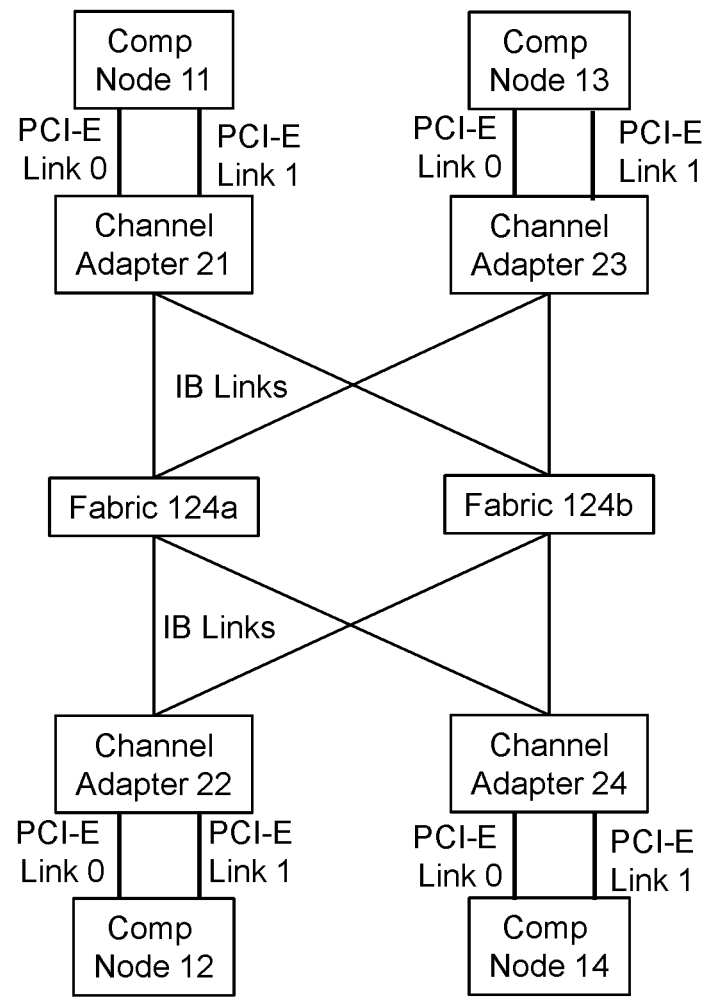
FIG. 2 illustrates a one-to-many case of channel adapter to CPUs.

FIG. 2 illustrates a one-to-many case of channel adapter to CPUs. InfiniBand (IB) links interconnect the channel adapters 21, 22, 23, 24. The channel adapters are multi-host capable and there are two PCI-E links (link 0 and link 1) between each multi-socket compute node host and its associated channel adapter. Such a configuration may be implemented, for example and without limitation, to increase IO processing capacity by connecting multi-host capable channel adapters to different CPU sockets with different PCI-E links. However, accessing the same shared memory addresses on a compute node via multiple PCI-E links can create inconsistency when, for example, contemporaneous write IOs to the same address are received on both PCI-E links. Mapping individual shared memory addresses to either link 0 or link 1 helps to avoid the problem.

Figure 3:
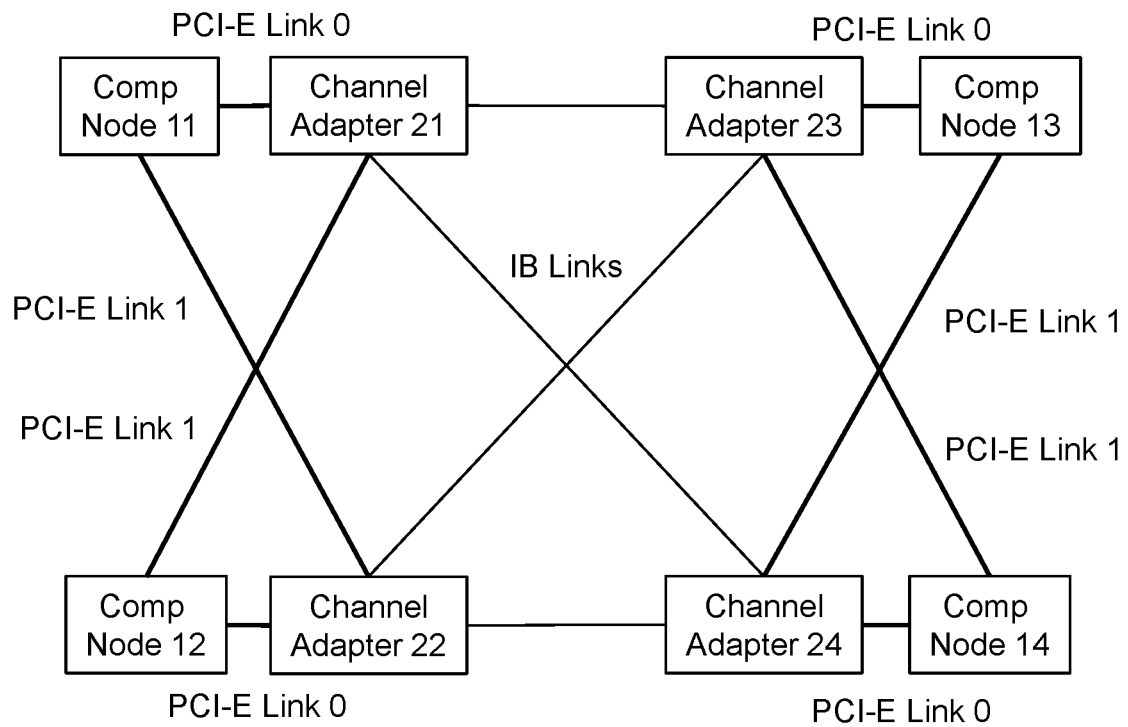
FIG. 3 illustrates a many-to-one case of channel adapters to CPU.

FIG. 3 illustrates a many-to-one case of channel adapters to CPU. Two different channel adapters from two motherboards are connected to each CPU socket via different PCI-E links. Data consistency cannot be maintained if concurrent transfers for the same address space utilize two different PCI-E links, regardless of the number of channel adapters involved. Using the same data path for all transfers for a given address space helps to solve the problem.

Figure 4:
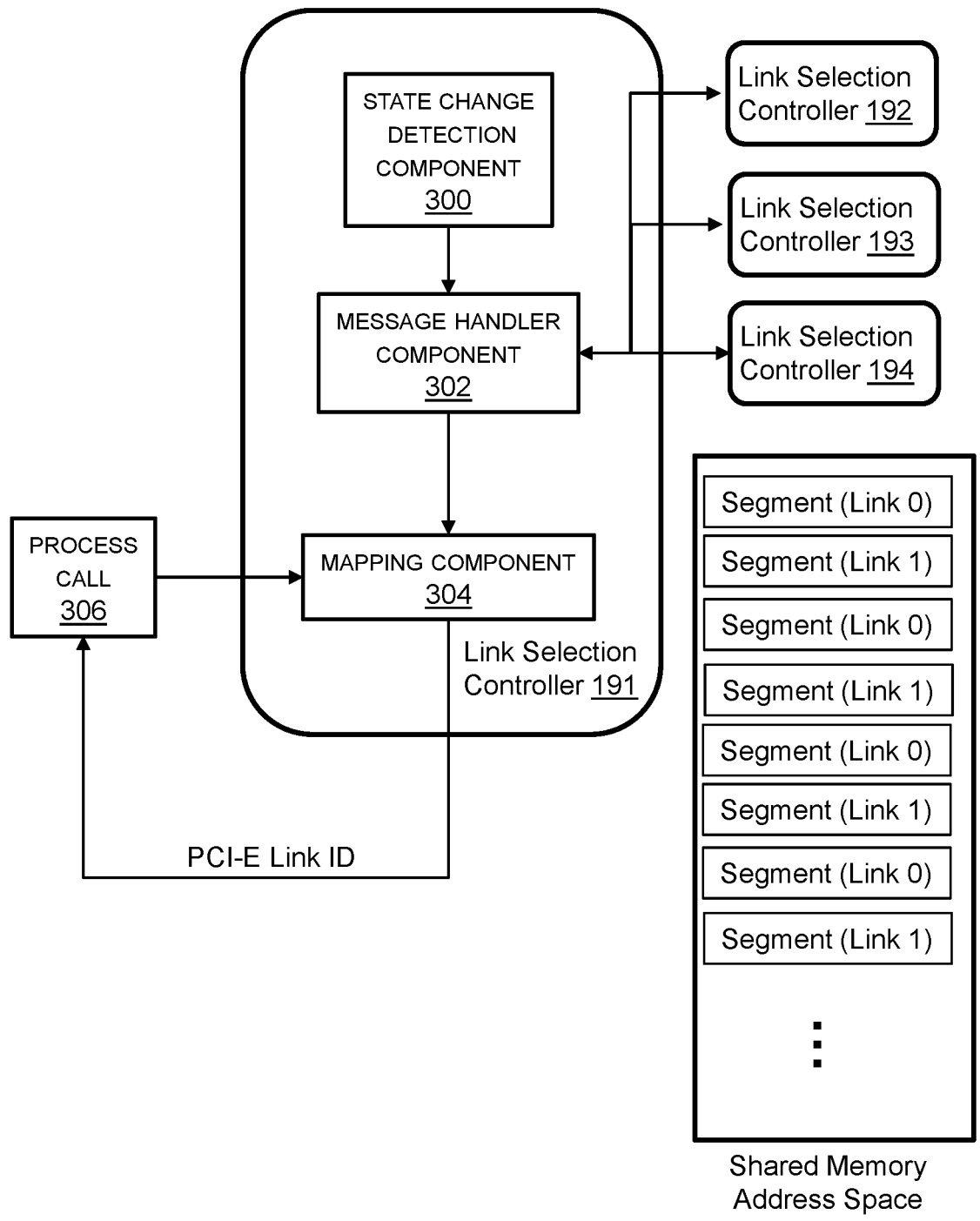
FIG. 4 illustrates components of one of the link selection controllers.

FIG. 4 illustrates components of one of the link selection controllers 191. The illustrated link selection controller is exemplary of all the link selection controllers. The shared memory address space 350 is divided into same-size segments. All addresses associated with any single segment map to only one of the PCI-E links, e.g., link 0 or link 1. Load balancing may be implemented such that equal numbers of segments map to each PCI-E link. The segment size is selected to be small enough to ensure load balance between both PCI-E links for random accesses, but large enough so that data structures comprising a single logical entity reside within the same segment to help guarantee data consistency. The mapping component 304 returns the ID of the PCI-E link mapped to a given address in response to a process call 306. The mapping components of all link selection controllers 191, 192, 193, 194 maintain the same mapping so all transfers to a given memory address utilize the same PCI-E link.

A state change detection component 300 monitors for hardware failures and analyzes detected hardware failures to determine if one of the PCI-E links has been impacted. If availability of a PCI-E link has changed, then the failure detection component 300 initiates a failover process. A message handler component 302 responds to the detected PCI-E link availability failure by sending out a high priority message over redundant networks to all link selection controllers of all CPUs in storage system, e.g., link selection controllers 192, 193, 194. Once the high-priority message has been received from the message handler component, the message handler component signals to cause the mapping component 304 to update the affected address segments so that they no longer map to the failed PCI-E link. The other link selection controllers 192, 193, 194 similarly cause their mapping components to update the affected address segments so that they no longer map to the failed PCI-E link.

Figure 5:
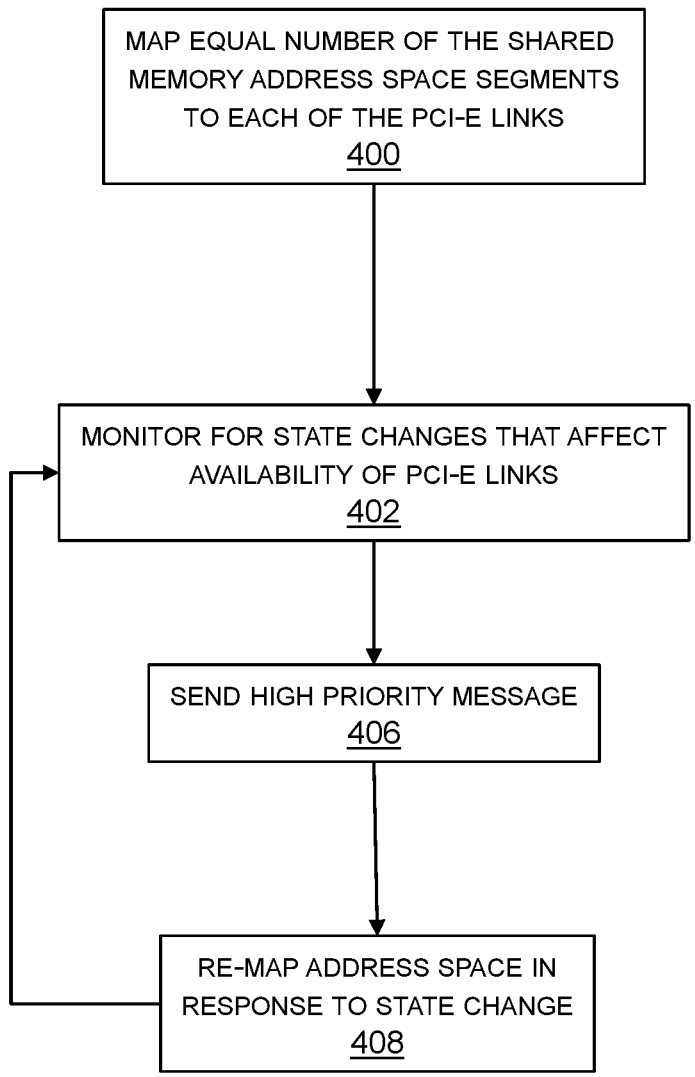
FIG. 5 illustrates steps performed by the link selection controllers.

FIG. 5 illustrates steps performed by the link selection controllers. An equal number of segments of the shared memory address space are mapped to each of the PCI-E links in step 400. Step 402 is monitoring for state changes that affect availability of PCI-E links. Step 404 is sending out a high priority message over redundant networks to all link selection controllers of all CPUs in storage system. Step 406 is re-mapping the address space in response to a detected state change. The steps are coordinated by all of the link selection controllers of all CPUs in the storage array such that the PCI-E link to address mapping is implemented system-wide and updates in response to detected state changes are coordinated system-wide.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
mapping individual addresses of a shared memory that is accessible by multiple central processing unit (CPU) hosts to one of a plurality of Peripheral Component Interconnect Express (PCI-E) links via which the shared memory is accessible; and
responding to a process call by identifying the PCI-E link to which a specified address in the shared memory is mapped.

2. The method of claim 1 further comprising organizing the shared memory into same-size segments that each contain a plurality of the addresses.

3. The method of claim 2 further comprising mapping all of the addresses in individual ones of the segments to the same PCI-E link.

4. The method of claim 3 further comprising associating equal numbers of segments to each of the PCI-E links.

5. The method of claim 3 further comprising monitoring for failures that affect availability of ones of the PCI-E links.

6. The method of claim 5 further comprising sending a message over redundant networks to link selection controllers in response to detection of a failure that affects availability of one of the PCI-E links.

7. The method of claim 6 further comprising re-mapping some of the addresses in response to detection of the failure.

8. An apparatus comprising:
a plurality of non-volatile drives; and
a plurality of compute nodes configured to manage access to the drives, each of the compute nodes comprising local memory that is shared with other ones of the compute nodes and a link selection controller configured to map individual addresses of the shared memory to one of a plurality of Peripheral Component Interconnect Express (PCI-E) links via which the shared memory is accessible and identify the PCI-E link to which a specified address in the shared memory is mapped in response to a process call.

9. The apparatus of claim 8 further comprising the link selection controllers configured to organize the shared memory into same-size segments that each contain a plurality of the addresses.

10. The apparatus of claim 9 further comprising the link selection controllers configured to map all of the addresses in individual ones of the segments to the same PCI-E link.

11. The apparatus of claim 10 further comprising the link selection controllers configured to associate equal numbers of segments to each of the PCI-E links.

12. The apparatus of claim 10 further comprising the link selection controllers configured to monitor for failures that affect availability of ones of the PCI-E links.

13. The apparatus of claim 12 further comprising the link selection controllers configured to send a message over redundant networks to the other link selection controllers in response to detection of a failure that affects availability of one of the PCI-E links.

14. The apparatus of claim 13 further comprising the link selection controllers configured to re-map some of the addresses in response to detection of the failure.

15. A non-transitory computer-readable storage medium storing instructions that are executed by a storage system to perform a method comprising:
mapping individual addresses of a shared memory that is accessible by multiple central processing unit (CPU) hosts to one of a plurality of Peripheral Component Interconnect Express (PCI-E) links via which the shared memory is accessible; and
responding to a process call by identifying the PCI-E link to which a specified address in the shared memory is mapped.

16. The non-transitory computer-readable storage medium of claim 15 in which the method further comprises organizing the shared memory into same-size segments that each contain a plurality of the addresses.

17. The non-transitory computer-readable storage medium of claim 16 in which the method further comprises mapping all of the addresses in individual ones of the segments to the same PCI-E link.

18. The non-transitory computer-readable storage medium of claim 17 in which the method further comprises monitoring for failures that affect availability of ones of the PCI-E links.

19. The non-transitory computer-readable storage medium of claim 18 in which the method further comprises sending a message over redundant networks to link selection controllers in response to detection of a failure that affects availability of one of the PCI-E links.

20. The non-transitory computer-readable storage medium of claim 19 in which the method further comprises re-mapping some of the addresses in response to detection of the failure.

* * * * *